(12) United States Patent
Grover

(10) Patent No.: US 8,187,363 B2
(45) Date of Patent: May 29, 2012

(54) PSA TAIL GAS PREHEATING

(75) Inventor: Bhadra S. Grover, Sugar Land, TX (US)

(73) Assignee: Air Liquide Process & Construction, Inc., Houston, TX (US)

( * ) Notice: Subject to any disclaimer, the term of this patent is extended or adjusted under 35 U.S.C. 154(b) by 394 days.

(21) Appl. No.: 12/613,068

(22) Filed: Nov. 5, 2009

(65) Prior Publication Data

US 2011/0100214 A1 May 5, 2011

(51) Int. Cl.
*B01D 53/047* (2006.01)
*C01B 3/38* (2006.01)
*C01B 3/56* (2006.01)

(52) U.S. Cl. .............................. 95/96; 95/106

(58) Field of Classification Search .............. 95/96, 106, 95/114, 116, 139, 140; 423/230, 247, 648.1; 110/203, 345
See application file for complete search history.

(56) References Cited

U.S. PATENT DOCUMENTS

| | | | | |
|---|---|---|---|---|
| 4,553,981 A | * | 11/1985 | Fuderer | 48/62 R |
| 4,814,156 A | | 3/1989 | Pinto | |
| 4,846,851 A | * | 7/1989 | Guro et al. | 95/100 |
| 5,714,132 A | | 2/1998 | Kapoor et al. | |
| 5,753,010 A | * | 5/1998 | Sircar et al. | 95/45 |
| 5,846,295 A | * | 12/1998 | Kalbassi et al. | 95/105 |
| 6,589,303 B1 | | 7/2003 | Lokhandwala et al. | |
| 7,699,907 B2 | * | 4/2010 | Grover et al. | 95/96 |
| 7,909,913 B2 | * | 3/2011 | Hufton et al. | 95/96 |
| 8,021,464 B2 | * | 9/2011 | Gauthier et al. | 95/96 |
| 2006/0104896 A1 | * | 5/2006 | Drnevich et al. | 423/648.1 |
| 2007/0000176 A1 | | 1/2007 | Liu et al. | |

FOREIGN PATENT DOCUMENTS

| | | |
|---|---|---|
| CA | 2324699 | 4/2002 |
| CA | 2324702 | 4/2002 |
| EP | 0212889 | 3/1987 |
| EP | 1582502 | 10/2005 |

OTHER PUBLICATIONS

PCT ISR and Written Opinion for PCT/US2010/054197, mailed May 2011.

* cited by examiner

*Primary Examiner* — Frank Lawrence, Jr.
(74) *Attorney, Agent, or Firm* — Elwood L. Haynes

(57) ABSTRACT

A process for improving the thermodynamic efficiency of a hydrogen generation system is provided. This includes producing a syngas stream in a reformer, wherein the reformer has a combustion zone. This also includes introducing a syngas stream into a pressure swing adsorption unit, thereby producing a product hydrogen stream and a tail gas stream. This also includes heating the tail gas stream by indirect heat exchange with a heat source, thereby producing a heated tail gas stream; and introducing the heated tail gas stream into the combustion zone.

8 Claims, No Drawings

PSA TAIL GAS PREHEATING

BACKGROUND

PSA tail gas is normally burnt as fuel in the SMR furnace. The PSA tail gas has low calorific value. PSA tail gas typically contains inert components such as 45%-50% CO2. The efficiency of burning PSA tail gas is impacted by the presence of these inert gases, as these are rejected with the flue gas at 250 F-400 F. The heat required to heat up these inert gases in the tail gas from ambient conditions (80 F-110 F) to the flue gas temperature of 250 F-400 F is lost.

The heat energy in the process gas after the shift reactor is recovered by producing steam or preheating BFW. However, the heat below 250 F-300 F cannot be recovered due to limited BFW quantity that corresponds to the steam production. The process gas below 250 F-300 F is normally cooled by air or cooling water before it is processed further in the PSA. This low level waste heat can be used to heat the PSA tail gas. Higher level heat from flue gas or syngas can also be used to heat PSA gas, instead of steam production, thus reducing the amount of export steam.

SUMMARY

The present invention is a method of improving the thermodynamic efficiency of a hydrogen generation system. This invention includes producing a syngas stream in a reformer, wherein said reformer has a combustion zone. This method also includes introducing a syngas stream into a pressure swing adsorption unit, thereby producing a product hydrogen stream and a tail gas stream. This method includes heating said tail gas stream by indirect heat exchange with a heat source, thereby producing a heated tail gas stream; and introducing said heated tail gas stream into said combustion zone.

DESCRIPTION OF PREFERRED EMBODIMENTS

The present invention would use waste heat in the flue gas or syngas, preferably low level waste heat, or other low grade heat sources, to preheat the PSA tail gas prior to introduction into the SMR furnace combustion system.

The process being disclosed here utilizes low level process heat to heat up the

PSA tail gas. This reduces the corresponding amount of fuel in the furnace. In one embodiment of the present invention, low-level-heat of syngas, which may be between about 250 F and about 300 F, may be used to heat the PSA tail gas.

In one embodiment of the present invention, the PSA tail gas is heated beyond the heat available from low level process heat. This may reduce the amount of BFW preheat and reduce the steam generation. For example the PSA tail gas may be heated to between about 700 F and about 800 F with effluent from the shift reactor. This reduces the amount of fuel required for the furnace.

In one embodiment of the present invention, the PSA tail gas may be heated by steam produced in the SMR or steam imported from outside the system. This will result fuel savings at the cost of steam usage. This may be desirable when steam has low value.

In one embodiment of the present invention, the PSA tail gas may be heated by the flue gas of the furnace. This may result in reduced steam generation. The PSA tail gas heater may be similar to the combustion air heaters that have large surface area and low pressure drop.

The PSA tail gas typically has a low pressure of between about 3 psig and about 7 psig. Therefore the pressure drop through the heater is important. The plate type exchangers with low pressure drop are utilized for this service.

PSA tail gas is mixed with make up fuel upstream of being heated.

PSA tail gas is compressed by an ejector using make up fuel as the motive force. This increases the pressure of the mixed fuel stream.

What is claimed is:

1. A method of improving the thermodynamic efficiency of a hydrogen generation system, comprising;
    producing a syngas stream in a reformer, wherein said reformer has a combustion zone;
    introducing a syngas stream into a pressure swing adsorption unit, thereby producing a product hydrogen stream and a tail gas stream;
    heating said tail gas stream by indirect heat exchange with a heat source, thereby producing a heated tail gas stream; and
    introducing said heated tail gas stream into said combustion zone.

2. The method of claim 1, wherein said heat source comprises the syngas stream.

3. The method of claim 2, wherein said syngas stream has a temperature of between about 250 F and about 300 F.

4. The method of claim 1, further comprising shifting carbon monoxide to carbon dioxide in a water gas shift reactor, thereby producing a shifted syngas stream, then introducing said shifted syngas stream into said pressure swing adsorption unit, wherein said heat source comprises said shifted syngas stream.

5. The method of claim 4, wherein said shifted syngas stream has a temperature of between about 700 F and about 800 F.

6. The method of claim 1, wherein said combustion zone generates a flue gas stream, further comprising recovering heat from said flue gas stream in a heat recovery steam generator, thereby producing a steam stream, wherein said heat source comprises said steam stream.

7. The method of claim 1, further comprising introducing an outside steam stream from a source external to said hydrogen generation system, wherein said heat source comprises said outside steam stream.

8. The method of claim 1, wherein said combustion zone generates a flue gas stream, wherein said heat source comprises said flue gas stream.

* * * * *